(12) United States Patent
Kurokawa et al.

(10) Patent No.: US 6,854,023 B2
(45) Date of Patent: Feb. 8, 2005

(54) DATA PROCESSING SYSTEM AND STORAGE CONTROL DEVICE USED THEREFOR

(75) Inventors: Isamu Kurokawa, Tokyo (JP); Hiroaki Nakanishi, Tokyo (JP); Masaru Tsukada, Tokyo (JP); Hisaharu Takeuchi, Tokyo (JP); Masahiro Kawaguchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/839,904

(22) Filed: May 5, 2004

(65) Prior Publication Data

US 2004/0210686 A1 Oct. 21, 2004

Related U.S. Application Data

(63) Continuation of application No. 10/251,495, filed on Sep. 20, 2002, now Pat. No. 6,754,727.

(30) Foreign Application Priority Data

Sep. 21, 2001 (JP) ........................................ 2001-288833

(51) Int. Cl.$^7$ ............................................... G06F 3/00
(52) U.S. Cl. .............................. 710/9; 710/36; 711/114; 711/170
(58) Field of Search ............................... 710/2–3, 8–10, 710/36–45; 711/114, 147–153, 170–173

(56) References Cited

U.S. PATENT DOCUMENTS

| 4,144,565 | A | * | 3/1979 | Bouknecht et al. ............ 710/62 |
|---|---|---|---|---|
| 4,939,636 | A | * | 7/1990 | Nakagawa et al. .......... 711/147 |
| 5,155,835 | A | * | 10/1992 | Belsan ........................ 711/114 |
| 5,428,748 | A | * | 6/1995 | Davidson et al. ............... 710/9 |
| 5,530,897 | A | * | 6/1996 | Meritt ............................ 710/9 |
| 5,537,566 | A | * | 7/1996 | Konno et al. ................ 711/114 |
| 5,745,864 | A | * | 4/1998 | Hosoe et al. .................. 701/35 |
| 5,893,139 | A | * | 4/1999 | Kamiyama ................... 711/117 |
| 6,105,077 | A | * | 8/2000 | Kimura ......................... 710/9 |
| 6,633,925 | B2 | * | 10/2003 | Fairchild et al. ............... 710/5 |
| 6,754,727 | B2 | * | 6/2004 | Kurokawa et al. ............. 710/9 |

* cited by examiner

Primary Examiner—Christopher Shin
(74) Attorney, Agent, or Firm—Townsend and Townsend and Crew LLP

(57) ABSTRACT

There is provided a data processing system which, from a point of view of increasing process efficiency of the entire data processing system to exhibit a maximum effect, may assign an alias device to a logic device. The data processing system of this invention comprises a host processing device (10) and a storage control device (20) connected thereto via a communication means (50), where the storage control device (20) has a deciding means for deciding, at a time of processing an I/O request of a certain base device, whether there is a need to newly assign an alias device to the base device according to a use situation of a physical device (203). When assignment is decided as necessary, the host processing device (10) is notified of such via the communication means, and the host processing device (10) newly assigns an alias device to the base device when there is the notification from the storage control device (20).

16 Claims, 6 Drawing Sheets

| BASE-ALIAS IDENTIFIER | LOGIC DEVICE NUMBER | BASE DEVICE NUMBER | COMBINATION IDENTIFIER |
|---|---|---|---|
| 80 | 0 | 0 | 0 |
| 80 | 1 | 1 | 0 |
| 80 | 2 | 2 | 0 |
| 80 | 3 | 3 | 0 |
| 80 | 4 | 4 | 0 |
| 40 | 5 | 3 | 1 |
| 40 | 6 | 2 | 2 |
| 40 | 7 | 1 | 1 |
| 00 | 8 | 0 | 0 |
| 00 | 9 | 0 | 0 |
| ... | ... | ... | ... |

301 302 303 304

300

80 : BASE DEVICE
40 : ALIAS DEVICE
00 : NOT DEFINED

FIG. 3

DATA PROCESSING SYSTEM AND STORAGE CONTROL DEVICE USED THEREFOR

CROSS REFERENCE TO RELATED APPLICATIONS

The present invention is a continuation of U.S. application Ser. No. 10/251,495, filed Sep. 20, 2002, now U.S. Pat. No. 6,754,727 which is related to and claims priority to Japanese Application No. 2001-288833, filed Sep. 21, 2001, all of which are herein incorporated by reference for all purposes.

BACKGROUND OF THE INVENTION

The present application claims priority upon Japanese Patent Application No. 2001-288833 filed on Sep. 21, 2001, which is herein incorporated by reference.

1. Field of the Invention

The present invention relates to a data processing system comprising a host processing device and a storage control device connected to the host processing device via a communication means and storing data sent from the host processing device, and the storage control device using this data processing system. In particular, the present invention relates to a technique for assigning an alias device to a base device in order to maximize the effect of the alias device from a viewpoint of the entire processing of the data processing system, in a mechanism where, in case the host processing device conducts an I/O process to a certain logic device (hereinafter referred to as "base device") and a control block assigned to the logic device (hereinafter referred to as "base control block") is in use thereupon, the process is conducted by a control block (hereinafter referred to as "alias control block") assigned to another logic device (hereinafter referred to as "alias control block").

2. Description of the Related Art

In a data processing system constructed by connecting a host processing device, such as a main frame, and a storage control device, such as a disk array device, when an I/O request is conducted to the storage control device from the host processing device, the host processing device designates an actual storage region, which is to be a target of processing, by a logic device which is defined to correspond with the actual storage region, and conducts this processing by a control block (hereinafter referred to as "base control block") assigned one to one to the logic device.

Here, in a general conventional data processing system, only one base control block could be assigned to the I/O processing of the certain logic device. Thus, for example, when the I/O request continuously occurs in respect to the certain logic device, a processing of the next I/O request could not be conducted until the processing of the previous I/O processing was completed, thereby causing a waiting time at the host processing device to occur.

In order to solve these inconveniences, for example, U.S. Pat. No. 5,530,897 discloses a mechanism where, in a case a base control block (in the above document, "Unit Control Blocks" corresponds to control block) of a certain logic device (hereinafter referred to as "base device") is in use, the I/O request is processed by a control block (hereinafter referred to as "alias control block") made to correspond to another logic device (hereinafter referred to as "alias device") assigned to the logic device.

Incidentally, since the number of alias devices defined between the host processing device and the storage control device is limited, it is ideal for the alias device to be assigned to the base device so the effect of the alias device may be exhibited to a maximum. Therefore, conventionally it was devised to make the effect of the alias device become as large as possible by methods such as in which a user predicts a processing load of each of the base control blocks and fixedly assigns the alias devices (i.e., static method) or in which the host processing device automatically assigns the alias devices according to the processing load of the base control block (i.e., dynamic method).

However, the assignment of the alias control blocks by the static method or the dynamic method is based on mainly circumstances of the host processing device such as a load state of the base control block, so that from the point of view of process efficiency of the entire data processing system comprised of the host processing device and the storage control device, there are many cases where assignment of the alias control block is not always optimized. For example, even if many alias devices are assigned to a base device with a high processing load, and waiting at the host processing device is decreased, if the I/O processing load in respect to a physical device of the storage control device is large, the effect of the alias control block from the viewpoint of the entire data processing system will be reduced.

SUMMARY OF THE INVENTION

The present invention is made in view of the above matters, and it is an object to provide a data processing system which may assign an alias device so an effect thereof is exhibited to a maximum from a point of view of improving process efficiency of the entire data processing system, and a storage control device using this data processing system.

In order to achieve this object, an aspect of the present invention is a data processing system comprising a host processing device, and a storage control device connected to the host processing device via a communication means and storing data sent from the host processing device, wherein: the host processing device and the storage control device specify, upon an I/O processing of data in respect to an actual storage region of the storage control device, the actual storage region which becomes a target of the processing by a logic device corresponding to the actual storage region; the host processing device comprises a plurality of control blocks processing an I/O request in respect to the storage control device, and comprises a means which, in a case an I/O request in respect to a certain logic device (base device) occurs, makes a control block (base control block) corresponding to the base device conduct a processing in respect to the I/O request, whereas, if the base control block is in use, makes a control block (alias control block) of another logic device (alias device) assigned to the logic device conduct the processing; the storage control device comprises a deciding means for deciding, upon processing an I/O request in respect to a certain logic device, whether or not there is a need to newly assign an alias device to the logic device according to a situation of one or a plurality of component elements within the storage control device, and a means for notifying the host processing device via the communication means to the effect that assigning is decided as necessary according to the decision; and the host processing device comprises a means for recognizing that an alias device is newly assigned to the base device when there is the notification from the storage control device.

BRIEF DESCRIPTION OF THE DRAWINGS

For a more complete understanding of the present invention and the advantages thereof, reference is now made to the following description taken in conjunction with the accompanying drawings wherein:

FIG. 3 is a diagram showing a base-alias management table according to an embodiment of the present invention;

DESCRIPTION OF THE PREFERRED EMBODIMENTS

Figure 1:
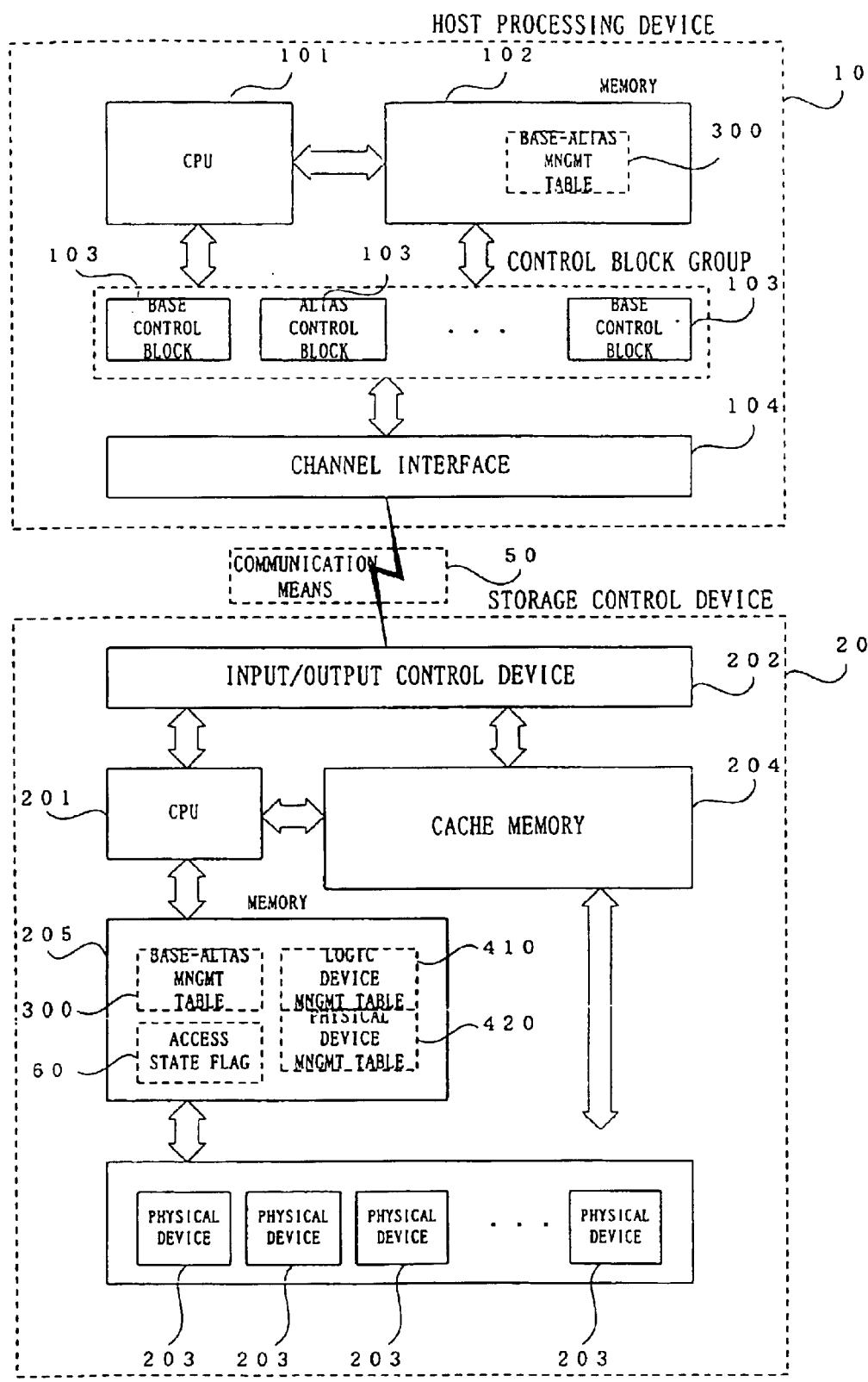
FIG. 1 is a diagram showing a schematic structure of a data processing system according to an embodiment of the present invention.

FIG. 1 shows a schematic structure of a data processing system which is described as an embodiment of the present invention. A host processing device 10 is structured by, for example, a main frame, a personal computer, or the like. This host processing device 10 is connected with a storage control device 20 via a communication means 50 such as a LAN or a SAN. As a storage control device 20, for example, there is, other than a disk array device, a semiconductor disk as a storage medium. In this embodiment the storage control device 20 is a disk array device, and disk units mounted on the disk array device structure a so-called RAID (Redundant Array of Independent Disks).

The host processing device 10 comprises, such as, a CPU 101, a memory 102, a plurality of control blocks 103 conducting an I/O processing in respect to the storage control device 20, and a channel interface 104 conducting input/output control of, such as, data transfer. On the other hand, the storage control device 20 comprises, such as, a CPU 201 conducting various control within the device 20, an input/output control device 202 conducting communication with the channel interface 104 of the host processing device 10 via the communication means 50, one or more physical devices 203 respectively structured by a disk unit providing an actual storage region for storing data sent from the host processing device 10, a cache memory 204 utilized at the time of reading and/or writing data to the physical device 203, and a memory 205 used for management of such as various data and table.

Figure 2:
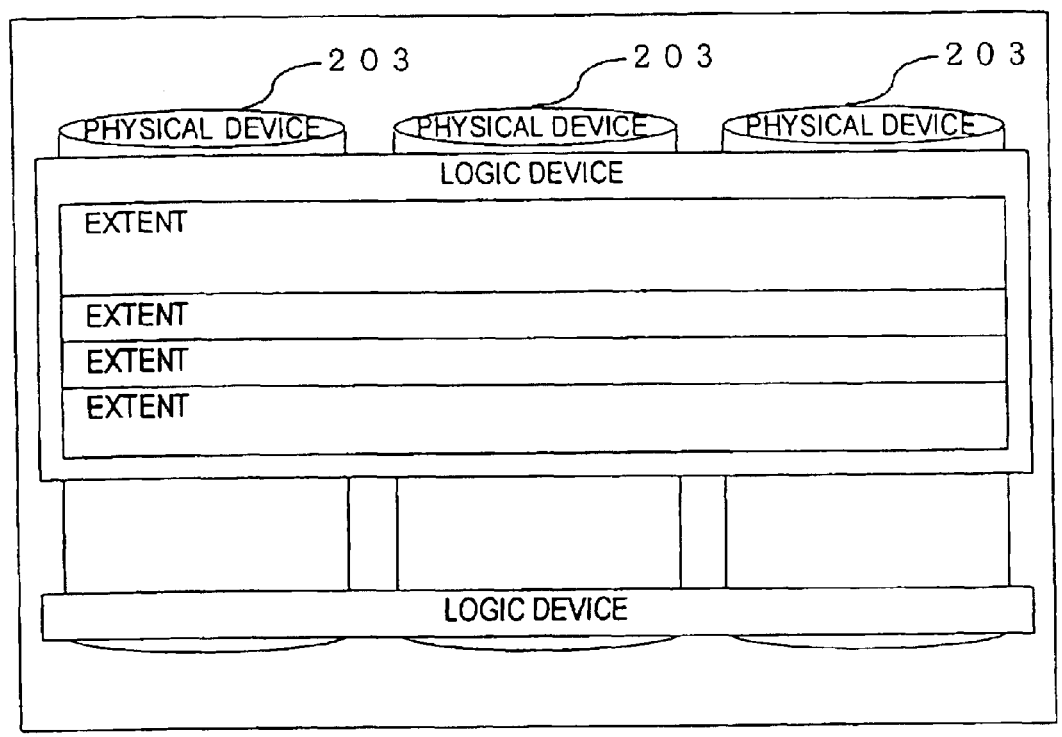
FIG. 2 is a diagram explaining a concept of a logic device and an extent according to an embodiment of the present invention.

The host processing device 10 and the storage control device 20 designates an actual storage region to be a target of the I/O processing by a logic device defined to correspond with an actual storage region provided by a single or a plurality of physical devices 203, at the time of the I/O processing in respect to the physical device 203 of the storage control device 20. FIG. 2 shows a concept of the logic device. Correspondence of this logic device and the actual storage region of the physical device 203 is registered in the host processing device 10 by such as a user or an operator, and the registered contents is stored to such as a memory of the host processing device 10.

When an I/O request to a certain logic device occurs, the host processing device 10 conducts a process regarding the I/O request using a control block (base control block) corresponding to this logic device (base device), whereas, if the base control block is in use for another I/O request processing, such processing is conducted by a control block (alias control block) corresponding to another logic device (alias device) assigned to the above-mentioned logic device.

In the storage control device 20, the way each of the logic devices are used is managed in a base-alias management table 300 of FIG. 3 which exists in the memory 205. This table 300 is described with such as a corresponding relationship of a logic device number 302 and a base control block number 303, and an identifying code 301 showing whether the logic device is a base device or an alias device. Note that, when the logic device is a base control block, the identifying code is set at "80", when logic device is an alias control block, the identifying code is set at "40", and in any other case the identifying code is set at "00". This base-alias management table 300 also exists in the memory 102 of the host processing device 10, and when the contents of the base-alias management table 300 of the host processing device 10 changes, the host processing device 10 suitably notifies the contents of such change to the storage control device 20 via the communication means 50, and based on this notification the storage control device 20 updates the contents of its base-alias management table 300.

Figure 4:
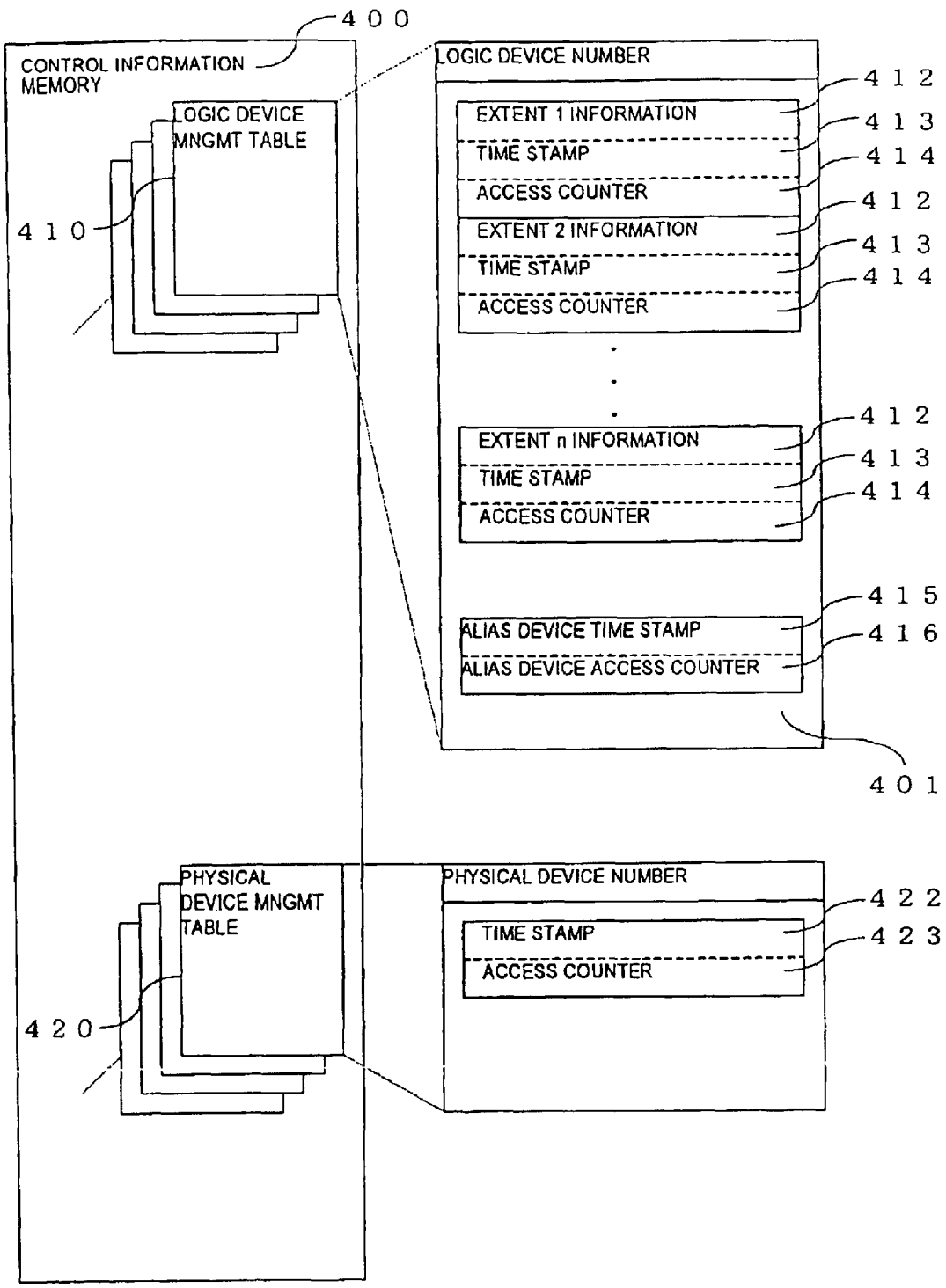
FIG. 4 is a diagram showing a logic device management table (logic device MNGMT table) and a physical device management table (physical device MNGMT table) according to an embodiment of the present invention.

Further, the tables shown in FIG. 4 show a logic device management table 410 and a physical device management table 420 stored in the memory 205 of the storage control device 20. The logic device management table 410 stores an extent information 412 of each logic device and a time stamp 413 and an access number 414 thereof, and a time stamp 415 and an access counter 416 of an alias device. As shown in FIG. 2, here, the "extent" is a storage region designated by a start address and an end address of a logic device (or there may be a case where the storage region is designated by using a head number, a cylinder number, or a track number) at the time the host processing device 10 conducts the I/O processing in respect to the storage control device 20, and the above extent information 412 is described with the start address and the end address (or, such as the head number, the cylinder number, or the track number). Further, the physical device management table 420 stores a time stamp 422 and an access counter 423 regarding each physical device 103.

Figure 5:
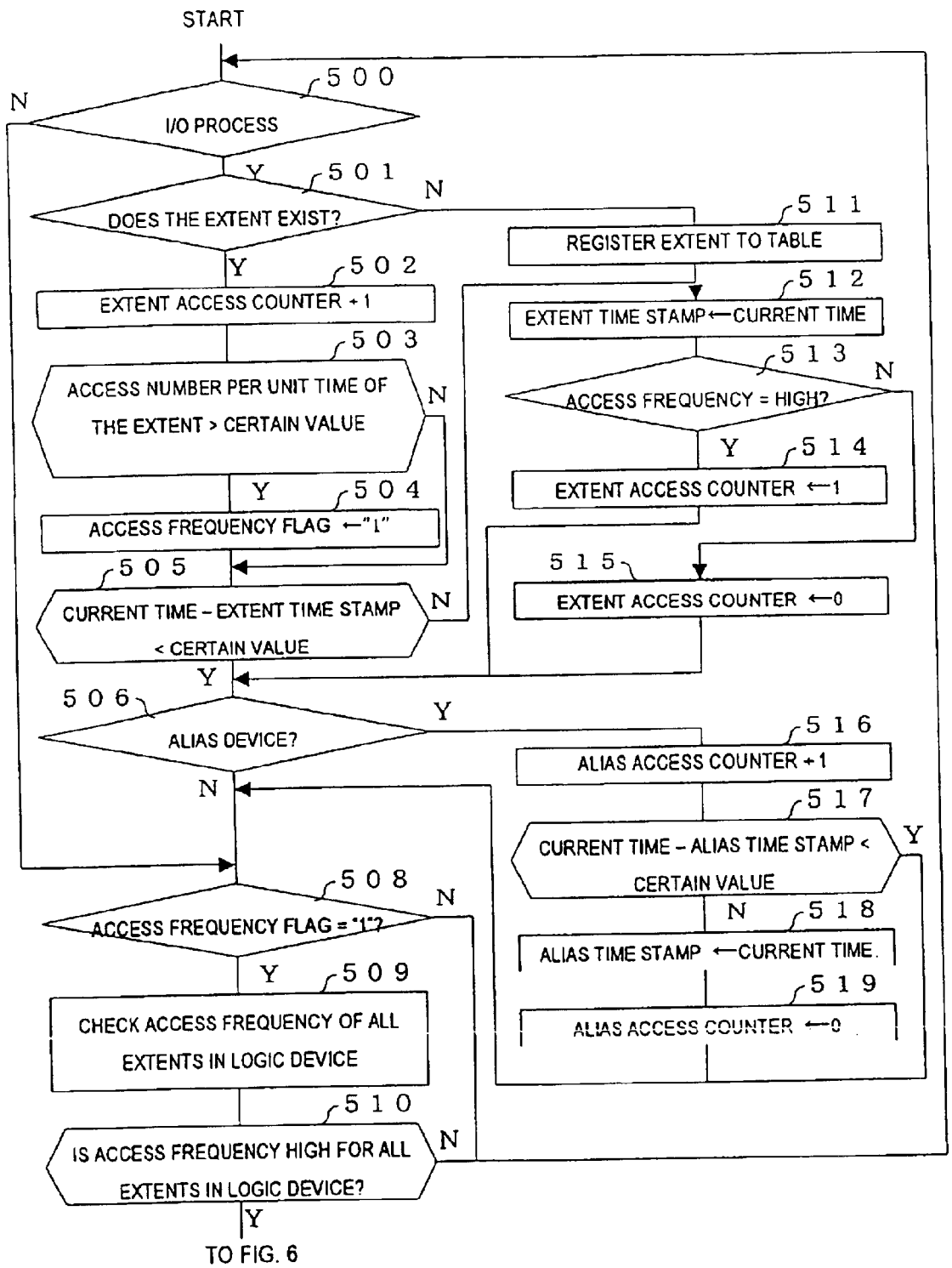
FIG. 5 is a flowchart explaining a process for deciding the necessity of assignment of an alias device, conducted in a storage control device, according to an embodiment of the present invention.
Figure 6:
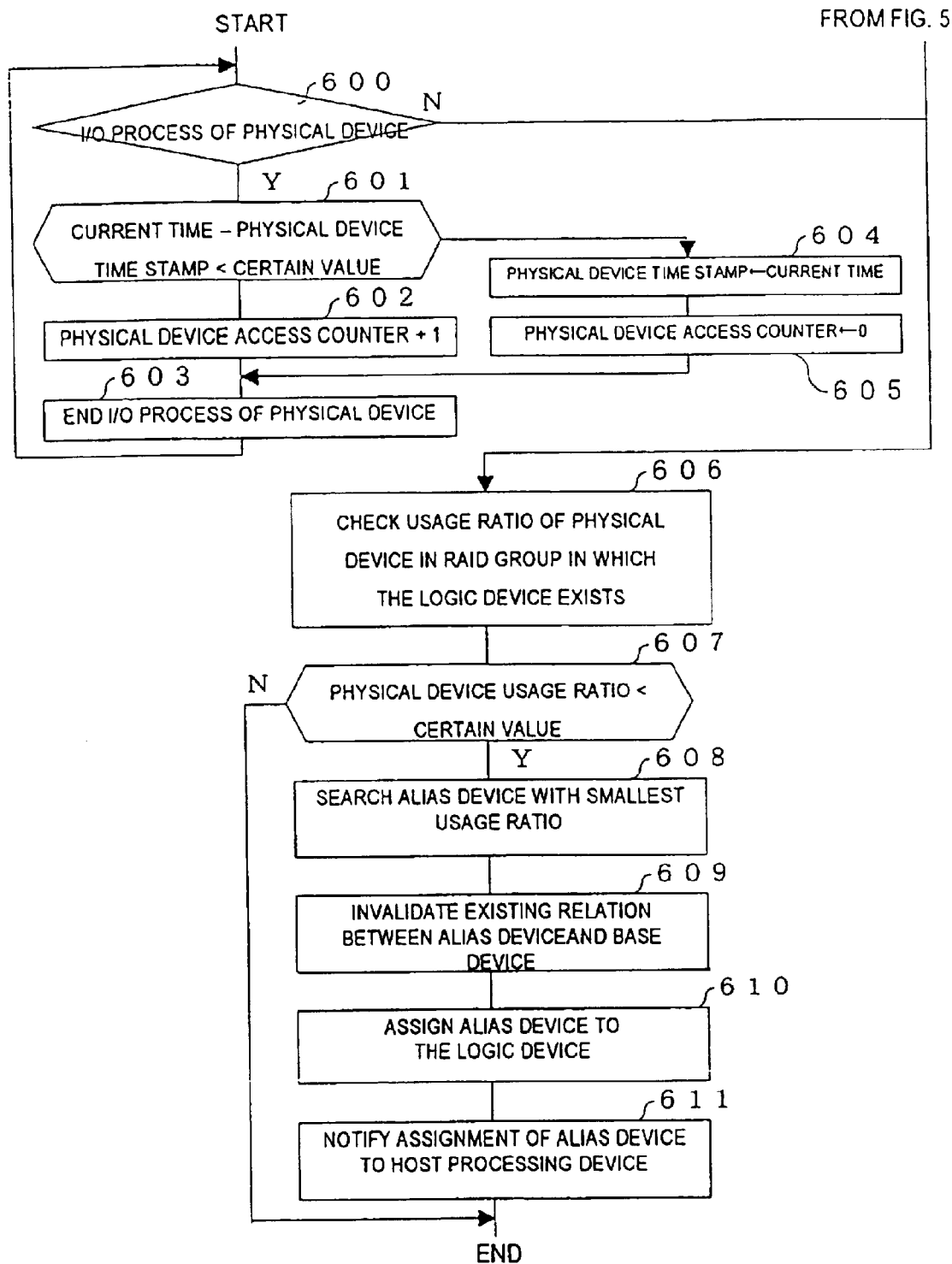
FIG. 6 is a flowchart explaining a process for deciding the necessity of assignment of the alias device, conducted in a storage control device, according to an embodiment of the present invention.

Next, at a time of a processing of an I/O request in respect to a certain logic device, a process relating to an assignment of an alias device, conducted in the storage control device 20, is described referring to flowcharts in FIGS. 5 and 6. Note that, this process comprises such as: (1) a process of checking, in an I/O processing in respect to a certain logic device, whether or not an average of an access frequency in respect to all extents of the logic device is higher than a certain value, and when the average is higher, deciding that there is a need to newly assign an alias device to the base device; (2) a process of deciding, in a case an average of a usage rate of each physical device within a RAID group is less than a certain value, that there is a need to newly assign an alias device to the base device; and (3) a process of selecting, in a case of newly assigning an alias device to the base device is decided as necessary by processes (1) and (2), a device with the smallest usage rate out of the existing alias devices, and notifying a specific information of such alias device to the host processing device 10 via the communication means.

Explanation is made according to FIG. 5. When an I/O request in respect to a certain logic device is sent from the host processing device 10, the storage control device 20 checks whether or not an extent designated by the I/O request exists from the extent information 412 of the logic device management table 410 (501). Here, if his extent exists, the access counter 414 regarding this extent of the logic device management table 410 is incremented (502).

Next, a decision of whether or not the access frequency of this extent is high is performed. This decision is conducted according to whether the access number per unit time in respect to the relevant extent is larger than a certain value or not, and if the access number is larger than the certain value, a flag "1" showing a high access frequency is set as an access state flag 60 stored in the memory 205 (503)(504). On the other hand, if this access number is equal to or less that the above-mentioned certain value or less, the access state flag 60 is set to "0".

The access number per unit time to the extent is calculated based on the following equation (a).

"Access number per unit time to extent"=(1÷(Current time−Time stamp 413 of extent))×Access counter 414  (a)

Next, a difference between the current time and the time stamp 413 of the relevant extent is compared with a certain period to see if the difference is longer (505), and if the difference is shorter, the process proceeds to (506). On the other hand, if the difference is longer, the current time is set to the time stamp 413 (512), the time stamp 413 of this extent is initialized, and further, if the access state flag 60 is searched and this is "1", that is, in a case the access frequency of this extent is high, the access counter 414 of this extent is set to "1" (513, 514), whereas, if the access frequency to the extent is low, the access counter is set to "0" (515).

On the other hand, when an extent does not exist in the deciding process of (501), the extent information corresponding to this extent and the time stamp 413 and an access counter 414 are newly registered in the logic device management table 410 (511), and further proceeds to the process of (512).

In the process of (506), whether this logic device is a base device or an alias device is checked from the base-alias identifier 301 of the base-alias relation table 300. In a case the logic device is a base device, the access state flag 60 regarding this extent is checked (508), and if this is "1", that is, if the extent has a high access frequency, each of the extents in the logic device to which the above-mentioned extent belongs are further checked to see whether its access frequency is high or not (510) with a similar method (503). As a result, if the access frequency regarding all extents is decided as high, the process proceeds to FIG. 6. Further, in any other case, the process regarding this I/O request is completed. On the other hand, if the access state flag 60 in the process of (508) is "0", the process regarding this I/O request is completed.

On the other hand, in the process of (506), if this logic device is an alias device, the access counter 406 of this alias device is incremented (516). Further, a difference between the current time and the time stamp 413 of the alias device is compared with a certain value to see whether the difference is equal to or less than the certain value (517), and if the difference is equal to or less than a certain value, the process shifts to (508). On the other hand, when the difference is larger than the certain value, the current time is set to the time stamp 413 of the alias device and the access counter 414 of this alias device is set to "0", then the process shifts to (508).

Next the process of FIG. 6 is described.

First, the storage control device 20 compares a usage rate of the physical device 103 within a RAID group to which the relevant logic device belongs, which ratio being calculated based on the following equations (b) and (c), with a certain value (606)(607).

"Usage ratio of physical device within RAID group to which logic device belongs"=Average of usage rate of physical device constructing RAID group  (b)

"Usage ratio of physical device"=(1÷(Current time−Time stamp 422 of logic device))×Access counter 423  (c)

Note that, the usage rate of each physical device constructing the RAID group is kept track of by processes (600) to (605) of FIG. 6. That is, when an I/O request in respect to a certain logic device occurs, a difference between the current time and the time stamp 422 within the physical device management table 420, and a certain value are compared (601), and if the difference is smaller than the certain value, a value of the access counter 423 of the physical device management table 420 is incremented.

On the other hand, if this difference is equal to or larger than a certain value (601), the time stamp 422 within the physical device management table 420 is updated to the current time (604), and the value of the access counter 423 is cleared to zero (605). In this way the usage rate of the physical device 103 is obtained.

As a result of the comparison of (607), if the usage rate of the physical device 103 is smaller than a certain value, it is decided necessary to newly assign an alias device to this logic device, and the process proceeds to that from (608). On the other hand, when the usage rate of the physical device 103 is equal to or larger than the certain value, the process is completed.

When it is decided necessary to newly assign the alias device, next, an assigning candidate of the alias device is selected (608).

First, based on the following equation (d), the alias device with the smallest usage rate is checked (608).

"Usage ratio of alias device"=(1÷(Current time−Time stamp 413 of alias device))×Access counter 414 of alias device  (d)

In this way, when the alias device with the smallest usage rate is selected, the storage control device sets the base alias identifier 301 of this alias device of the base-alias relation table 300 to "00", invalidates the relationship of this alias device and the base device (609), sets the base device number of the logic device, which is deemed necessary to be newly assigned an alias device, to the base device number 303 of this alias device, and further, the base-alias identifier 301 is set to "40".

Next, the storage control device 20 notifies the host processing device 10 of the updated contents of the above base-alias relation table. Thus, the host processing device 10 recognizes the necessity of addition of the alias device in respect to the relevant base device, and when the host processing device 10 is notified of this updated contents, the contents of the base-alias relation table 300 stored within the host processing device 10 is updated. In this way, the relevant logic device is newly assigned with the alias device. Then, by re-using an alias device with the smallest usage rate as the new alias device, the number of alias devices defined between the host processing device 10 and the storage control device 20 is kept to a small number, thereby a manufacturing cost of the storage control device 20 may be cut down.

Note that, although the above explanation is an explanation in a case where the physical device 203 is integrally incorporated in the storage control device 20, the physical device 203 may be constructed separately to the storage control device 20.

According to the data processing system of the present invention, from the point of view of improving process efficiency of the entire data processing system, the alias device may be assigned so the effect of the system is exhibited to its maximum.

Although the preferred embodiment of the present invention has been described in detail, it should be understood that various changes, substitutions and alternations can be made therein without departing from spirit and scope of the inventions as defined by the appended claims.

What is claimed is:

1. A storage device comprising:
   an input and output (I/O) controller for data exchange between the storage device and an external host device;
   a data processor in data communication with the I/O controller to service data requests made by the external host device;
   a cache memory in data communication with the data processor and the I/O controller to store data that is to be exchanged between the external host device and the storage device;
   a plurality of physical devices to store data received from the external host device;
   a plurality of logic devices comprising the physical devices, the data requests being made by referencing the logic devices, each logic device having an associated access frequency metric; and
   a memory to store the access frequency metrics, wherein the data processor is operable to assign an alias device to a base device associated with a logic device if the access frequency metric of the logic device is greater than a predetermined threshold.

2. A storage control device according to claim 1 wherein each logic device comprises one or more extents, each extent being associated with an extent access metric, wherein the access frequency metric associated with a logic device comprises the extent access metrics associated with its extents.

3. A storage control device according to claim 2 wherein the data processor is operable to compare the extent frequency metrics associated with the extents of a logic device against a predetermined threshold if the extent access metric for one of its extents exceeds a predetermined threshold.

4. A storage control device according to claim 3 wherein the memory further stores an alias device access counter that is associated with a logic device if the extent access metric for one of its extents exceeds a predetermined threshold and if the logic devise is an alias device, the alias device access counter indicative of a frequency of access to the alias device.

5. A storage control device according to claim 4 wherein the data processor assigns an alias device to a base device associated with a logic device if a total access frequency exceeds a predetermined threshold, wherein the total access frequency is a total of the extent access frequency metrics of the extents of the logic device.

6. A storage control device according to claim 5 wherein each of the physical devices is associated with a physical device access counter that is indicative of a frequency of access to the physical device, wherein the data processor is operable to check the physical device access counters of the physical devices associated with a logical device if a total access frequency exceeds a predetermined threshold, wherein the total access frequency is a total of the extent access frequency metrics of the extents of the logic device.

7. A storage control device according to claim 1 wherein the memory further stores an alias device access counter that is associated with a logic device if the extent access metric for one of its extents exceeds a predetermined threshold and if the logic devise is an alias device), the alias device access counter indicative of a frequency of access to the alias device.

8. A storage control device according to claim 1 wherein each of the physical devices is associated with a physical device access counter that is indicative of a frequency of access to the physical device, wherein the data processor is operable to check the physical device access counters of the physical devices associated with a logical device if a total access frequency exceeds a predetermined threshold, wherein the total access frequency is a total of the extent access frequency metrics of the extents of the logic device.

9. A method of controlling a disk array apparatus corresponding to the storage control device of claim 1.

10. A method of controlling a disk array apparatus corresponding to the storage control device of claim 2.

11. A method of controlling a disk array apparatus corresponding to the storage control device of claim 3.

12. A method of controlling a disk array apparatus corresponding to the storage control device of claim 4.

13. A method of controlling a disk array apparatus corresponding to the storage control device of claim 5.

14. A method of controlling a disk array apparatus corresponding to the storage control device of claim 6.

15. A method of controlling a disk array apparatus corresponding to the storage control device of claim 7.

16. A method of controlling a disk array apparatus corresponding to the storage control device of claim 8.

* * * * *